US009002543B2

(12) United States Patent
Dorneich et al.

(10) Patent No.: US 9,002,543 B2
(45) Date of Patent: Apr. 7, 2015

(54) SITUATION AFTERMATH MANAGEMENT SYSTEM AND METHOD

(71) Applicant: Honeywell International Inc., Morristown, NJ (US)

(72) Inventors: Michael Christian Dorneich, Ames, IA (US); Chris Hamblin, League City, TX (US); William Rogers, Minneapolis, MN (US); Stephen Whitlow, St. Louis Park, MN (US)

(73) Assignee: Honeywell International Inc., Morristown, NJ (US)

( * ) Notice: Subject to any disclaimer, the term of this patent is extended or adjusted under 35 U.S.C. 154(b) by 176 days.

(21) Appl. No.: 13/721,192

(22) Filed: Dec. 20, 2012

(65) Prior Publication Data

US 2014/0180502 A1 Jun. 26, 2014

(51) Int. Cl.

*G06F 17/00* (2006.01)
*G06F 19/00* (2011.01)
*G08B 23/00* (2006.01)
*B64C 19/02* (2006.01)
*G07C 5/00* (2006.01)
*G08G 5/00* (2006.01)

(52) U.S. Cl.

CPC ................ *G07C 5/00* (2013.01); *G08G 5/0056* (2013.01)

(58) Field of Classification Search

USPC ............... 701/1, 3, 4, 8, 9, 14, 36, 29.1, 29.2, 701/29.6, 30.2, 31.6, 31.7, 31.8, 31.9, 32.1, 701/32.7, 33.2, 33.4, 33.5, 34.2, 34.3, 34.4; 340/945, 951, 963; 244/75.1, 76 R, 244/175, 183

See application file for complete search history.

(56) References Cited

U.S. PATENT DOCUMENTS

| | | | | |
|---|---|---|---|---|
| 4,115,847 | A * | 9/1978 | Osder et al. | 700/4 |
| 6,128,017 | A | 10/2000 | Alimpich et al. | |
| 6,414,594 | B1 | 7/2002 | Guerlain | |
| 7,496,580 | B2 | 2/2009 | Hajdukiewicz et al. | |
| 7,574,591 | B2 | 8/2009 | Downer et al. | |
| 7,646,294 | B2 | 1/2010 | Kow et al. | |
| 7,734,451 | B2 | 6/2010 | MacArthur et al. | |
| 8,013,864 | B2 | 9/2011 | Foslien | |
| 2004/0143479 | A1 | 7/2004 | Jamieson et al. | |
| 2007/0260992 | A1 | 11/2007 | Hajdukiewicz | |

(Continued)

FOREIGN PATENT DOCUMENTS

| | | | |
|---|---|---|---|
| EP | 0715222 | A1 | 6/1996 |
| EP | 1073943 | B1 | 1/2003 |

*Primary Examiner* — Thomas Tarcza
*Assistant Examiner* — Edward Pipala
(74) *Attorney, Agent, or Firm* — Ingrassia Fisher & Lorenz, P.C.

(57) ABSTRACT

A system and method for assisting flight crew recovery in the aftermath of an unexpected event is provided. A processor is used to detect that an unexpected event has occurred in an aircraft and, in response to detecting that the unexpected event has occurred, state data are stored in memory. The processor is also used to detect that the unexpected event has been resolved and, in response to detecting that the unexpected event has been resolved, the processor retrieves the state data from the memory, generates an aftermath plan that includes prompts to guide the flight crew to complete the aftermath plan, and continuously updates the aftermath plan until the aftermath plan is completed.

20 Claims, 2 Drawing Sheets

(56) References Cited

U.S. PATENT DOCUMENTS

| | | | | |
|---|---|---|---|---|
| 2009/0112532 | A1 | 4/2009 | Foslien et al. | |
| 2010/0017241 | A1* | 1/2010 | Lienhardt | 705/8 |
| 2010/0156655 | A1 | 6/2010 | Bullemer et al. | |
| 2010/0211192 | A1 | 8/2010 | Stluka et al. | |
| 2010/0293454 | A1* | 11/2010 | Holder et al. | 715/243 |
| 2010/0312522 | A1 | 12/2010 | Laberge et al. | |
| 2011/0258021 | A1* | 10/2011 | Mumaw et al. | 705/7.38 |
| 2012/0004794 | A1* | 1/2012 | Guilley et al. | 701/14 |
| 2012/0059682 | A1 | 3/2012 | Kiff et al. | |
| 2012/0221374 | A1 | 8/2012 | Kiff et al. | |

* cited by examiner

SITUATION AFTERMATH MANAGEMENT SYSTEM AND METHOD

TECHNICAL FIELD

The present invention generally relates to managing in the aftermath of an event, and more particularly relates to a system and method for assisting recovery by a flight crew during the aftermath of an unexpected event.

BACKGROUND

Aircraft are robustly designed, and thus operate safely and reliably. Though highly unlikely, it is nonetheless postulated that an aircraft could experience one or more unexpected events during its service lifetime. These unlikely, yet postulated events may be generally categorized as non-normal events and off-nominal events. A non-normal event is one that may be triggered by a system failure, and typically has an associated recovery procedure to assist the flight crew in resolving the event. An off-nominal event is typically not as serious as a non-normal event, but can nonetheless disrupt normal aircraft operations. These events typically do not have an associated recovery procedure. Thus, in the case of a non-normal event, there is a known recovery procedure to resolve the event. However, in the case of an off-nominal event, there may not be a recovery procedure, requiring the flight crew to rely on knowledge, training, and experience to resolve the event.

No matter the specific category of an unexpected event, if one of these unlikely events occurs, any one or more of the normal procedures being implemented by the flight crew will be interrupted. Moreover, after the unexpected event is resolved, these interrupted tasks will likely be incomplete. Thus, in the aftermath of event resolution, in addition to having to restart interrupted tasks, the consequences of the actions taken to resolve the event need to be dealt with. Unfortunately, there are presently no procedures to implement in the aftermath of a successful unexpected event resolution.

Hence, there is a need for a system and method for assisting a flight crew in recovery in the aftermath of an unexpected event. The present invention addresses at least this need.

BRIEF SUMMARY

In one embodiment, a method of assisting recovery by a flight crew in the aftermath of an unexpected event includes using a processor to detect that an unexpected event has occurred in an aircraft. In response to detecting that the unexpected event has occurred, state data are stored in memory. The state data are representative of at least partially completed flight crew tasks that were initiated before the unexpected event occurred, configurations of selected cockpit components when the unexpected event occurred, flight crew state when the unexpected event occurred, passenger state when the unexpected event occurred, aircraft state when the unexpected event occurred, and air traffic control (ATC) state when the unexpected event occurred. The processor is used to detect that the expected event has been resolved. In response to detecting that the unexpected event has been resolved, the processor is used to retrieve the state data from the memory, generate an aftermath plan that includes prompts to guide the flight crew to complete the aftermath plan, and continuously update the aftermath plan until the aftermath plan is completed.

In another embodiment, a system for assisting recovery by a flight crew in the aftermath of an unexpected event includes memory and a processor. The memory is configured to have data stored therein. The processor is in operable communication with the memory and configured to detect that an unexpected event has occurred in an aircraft and, upon detecting that the unexpected event has occurred, store state data in the memory, the state data representative of at least partially completed flight crew tasks that were initiated before the unexpected event occurred, configurations of selected cockpit components when the unexpected event occurred, flight crew state when the unexpected event occurred, passenger state when the unexpected event occurred, aircraft state when the unexpected event occurred, and air traffic control (ATC) state when the unexpected event occurred. The processor is further configured to detect that the expected event has been resolved and, in response to detecting that the unexpected event has been resolved, to retrieve the state data from the memory, generate an aftermath plan that includes prompts to guide the flight crew to complete the aftermath plan, and continuously update the aftermath plan until the aftermath plan is completed.

Furthermore, other desirable features and characteristics of the situation aftermath management system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
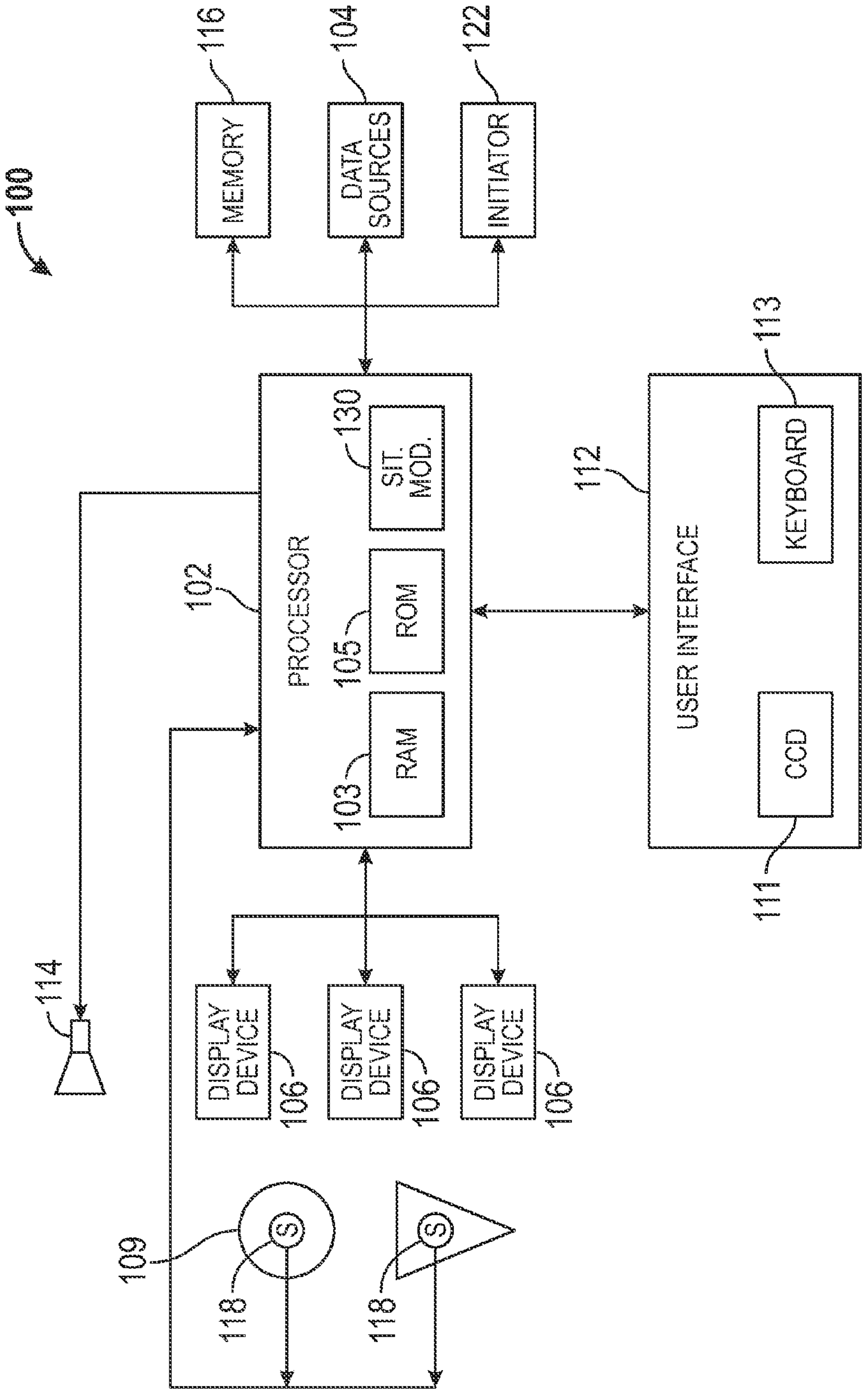
FIG. 1 depicts a functional block diagram of at least a portion of one exemplary embodiment of an aircraft flight deck system that implements an aftermath manager.

A functional block diagram of at least a portion of an exemplary aircraft flight deck system 100 is depicted in FIG. 1, and includes a processor 102, a plurality of data sources 104, and a plurality of display devices 106. The processor 102 is in operable communication with the data sources 104 and the display device 106. The processor 102 is coupled to receive various types of aircraft data from the data sources 104, and may be implemented using any one (or a plurality) of numerous known general-purpose microprocessors or application specific processor(s) that operates in response to program instructions. In the depicted embodiment, the processor 102 includes on-board RAM (random access memory) 103, and on-board ROM (read only memory) 105. The program instructions that control the processor 102 may be stored in either or both the RAM 103 and the ROM 105. For example, the operating system software may be stored in the ROM 105, whereas various operating mode software routines and various operational parameters may be stored in the RAM 103. It will be appreciated that this is merely exemplary of one scheme for storing operating system software and software routines, and that various other storage schemes may be implemented. It will also be appreciated that the processor 102 may be implemented using various other circuits, not just a programmable processor. For example, digital logic circuits and analog signal processing circuits could also be used. In this respect, the processor 102 may include or cooperate with any number of software programs (e.g., avionics display programs) or instructions designed to carry out various methods, process tasks, calculations, and control/display functions described below.

The data sources 104, among various other functions, supply the above-mentioned aircraft data to the processor 102. The data sources 104 may include a wide variety of cockpit components. By way of example, the cockpit components 104 may include one or more of a runway awareness and advisory system, an instrument landing system, a flight director system, a weather data system, a terrain avoidance and warning system, a traffic and collision avoidance system, a terrain database, an inertial reference system, and a flight management system, and a procedures database. The data sources 104 may also include various databases, such as a navigational database, and a procedures database, and various mode, position, and/or detection elements (e.g., gyroscopes, global positioning systems, inertial reference systems, avionics sensors, etc.) capable of determining the mode and/or position of the aircraft relative to one or more reference locations, points, planes, or navigation aids, as well as the present position and altitude of the aircraft.

The display devices 106 are used to display various images and data, in one or more of a graphic, iconic, and a textual format, and to supply visual feedback to the user 109. It will be appreciated that the display devices 106 may be implemented using any one of numerous known displays suitable for rendering graphic, iconic, and/or text data in a format viewable by the user 109. Non-limiting examples of such displays include various cathode ray tube (CRT) displays, and various flat panel displays, such as various types of LCD (liquid crystal display), TFT (thin film transistor) displays, and OLED (organic light emitting diode) displays. The displays may additionally be based on a panel mounted display, a HUD projection, or any known technology.

No matter the number or particular type of displays that are used to implement the display device 106, it was noted above that the processor 102 is responsive to the various data it receives to render various images on the display devices 106. The images that the processor 102 renders on the display devices 106 will depend, for example, on the type of display being implemented. For example, the display device 106 may implement one or more of a multi-function display (MFD), a three-dimensional MFD, a primary flight display (PFD), a synthetic vision system (SVS) display, a vertical situation display (VSD), a horizontal situation indicator (HSI), a traffic awareness and avoidance system (TAAS) display, a three-dimensional TAAS display, just to name a few. Moreover, the display devices 106 may also be implemented in an electronic flight bag (EFB) and, in some instance, some or all of the system 100 may be implemented in an EFB.

The depicted system 100 may also include a user interface 112 and one or more audio output devices 114. The user interface 112, if included, is in operable communication with the processor 102 and is configured to receive input from the pilot 109 and, in response to the user input, supply command signals to the processor 102. The user interface 112 may be any one, or combination, of various known user interface devices including, but not limited to, a cursor control device (CCD) 111, such as a mouse, a trackball, or joystick, and/or a keyboard, one or more buttons, switches, or knobs. In the depicted embodiment, the user interface 112 includes a CCD 111 and a keyboard 113. The pilot 109 uses the CCD 111 to, among other things, move a cursor symbol on the display device 106, and may use the keyboard 113 to, among other things, input textual data.

The audio output devices 114 may be variously implemented. No matter the specific implementation, each audio output device 114 is preferably in operable communication with the processor 102. The processor 102, other non-depicted circuits or devices, supplies analog audio signals to the output devices 114. The audio devices 114, in response to the analog audio signals, generate audible sounds. The audible sounds may include speech (actual or synthetic) or generic sounds or tones associated with alerts and notifications.

In addition to the functions described above, the processor 102 is configured to implement what is referred to herein as a situation modeler 130. The situation modeler 130 collects data from one or more of the data sources 104, and generates situation models for the aircraft. The situation modeler 130 is preferably configured to monitor and analyze data patterns to build, identify, and categorize models of flight crew tasks, flight crew state, generalized passenger state, aircraft state, and air traffic control state. These models are used by the situation modeler 130 to identify and correlate aircraft behaviors, pilot behaviors, and the interaction of these behaviors to detect that an unexpected event has occurred in the aircraft. These models are accumulated over time to generate a normative model of appropriate response for a given situation, based on mapping pilot behaviors to successful aftermath outcomes by situation. These models are additionally used by the situation modeler 130 to assist flight crew recovery in the aftermath of the unexpected event.

More specifically, the processor 102, implementing the situation modeler 130, detects that an unexpected event has occurred in the aircraft by attempting to match the current situation to catalogued situations. Upon detecting that an unexpected event has occurred, the processor 102 is configured to store various data in memory 116, which is also in operable communication with the processor 102. The data that the processor 102 stores in the memory may vary, but are at least data representative of partially completed flight crew tasks that were initiated before the unexpected event occurred, and data representative of the configuration of at least selected ones of the plurality of cockpit components before the unexpected event occurred. The specific cockpit components for which configuration data are stored may vary, and may include, for example, screen shots of one or more of the display devices 106, the positions of various switches and knobs, internal states of aircraft systems, just to name a few.

The processor 102, implementing the situation modeler 130, is also configured to detect when the unexpected event has been resolved and, upon detecting the resolution, to determine how best to support the flight crew in dealing with the aftermath of the unexpected event. More specifically, the processor 102 will retrieve from the memory 116 the data representative of partially completed pilot tasks and configurations of the selected cockpit components. The processor 102 will then, as a minimum, generate a reminder that prompts the flight crew to complete the partially completed flight crew tasks, and generates signals that will return the selected cockpit components to the configurations before the unexpected event occurred. The reminder may be implemented visually, aurally, or both. A visual reminder will be rendered on one or more of the display devices 106, and an aural reminder will supplied via the audio device(s) 114.

In addition to the above-described functions, the processor 102, implementing the situational model 130, may also be configured, upon detecting that the unexpected event has been resolved, to generate a prioritized list of flight crew tasks to return the aircraft to a desirable state. The processor 102 may additionally be configured to generate a timeline of actions taken by the flight crew to resolve the unexpected event and/or a timeline of actions the flight crew should take following the unexpected event. The processor 102 may also command one or more of the display devices 106 to render the timeline(s). The processor 102 may also be configured to implement a prospective memory aid, whereby it generates one or more reminders that remind the flight crew of one or more future tasks.

In a particular preferred embodiment, the situational model 130 is also configured to assess the current flight crew state, the current aircraft state, and general passenger states. Based on these assessments, the situational model 130, upon detection that the unexpected event has been resolved, can determine the overall consequences of the flight crew actions that were taken to resolve the unexpected event, and then determine an optimal recovery strategy. The flight crew state may be determined using any one of several techniques. For example, the flight crew state can be determined using various types of sensors 118 that are configured to sense and supply data representative of a general state of a person. The particular type of sensor data may vary, and some non-limiting examples of sensor data include physiological data, contextual data, and/or various other relevant data. The sensors 118 may be located on the body and/or clothing of a person, and/or on one or more other devices (e.g., helmet, eye wear) worn by the person. In some implementations, one or more of the sensors 118 may be disposed nearby the person.

It will additionally be appreciated that the number and type of sensors 118 may vary. Some non-limiting examples of suitable physiological sensors include an electroencephalogram (EEG) sensor, an electrocardiogram (ECG) sensor, an electro-oculogram (EOG) sensor, an impedance pneumogram (ZPG) sensor, a galvanic skin response (GSR) sensor, a blood volume pulse (BVP) sensor, a respiration sensor, an electromyogram (EMG) sensor, a pupilometry sensor, a visual scanning sensor, a blood oxygenation sensor, a blood pressure sensor, a skin and core body temperature sensor, a near-infrared optical brain imaging sensor, or any other device that can sense physiological changes in the user.

The situational model 130 may determine the aircraft state from data supplied from various ones of the data sources 104. For example, the situational model 130 may determine aircraft speed, altitude, heading, location, etc. from data supplied by the mode, position, and/or detection elements (e.g., gyroscopes, global positioning systems, inertial reference systems, avionics sensors, etc.). The situational model 130 may, for example, determine the phase of flight of the aircraft from data supplied by the flight management system. The situational model 130 may also, for example, determine the current state of interrupted tasks or checklists.

The situational model 130 may additionally determine the air traffic state from data supplied from various ones of the data sources 104. The data sources 104 may include communications from AOC or ATC via radio or datatlink. The situational model 130 may, for example, determine the state of other aircraft in the area and how their flight plans will affect the current aircraft, and any implications for making changes to the current airctraft's flight plan in the aftermath of the event resolution.

The situational model 130 may determine the general passenger state inferentially, using data supplied from various ones of the data sources 104. For example, the situational model 130 may determine general passenger state from the number of passengers on-board the aircraft, the flight duration at the time the unexpected event occurred and was resolve, the general flight conditions from take-off to resolution of the unexpected event, the relative impact of the unexpected event, the future flight time, and future flight conditions just to name a few.

Up to this point, the methodology whereby the processor 102 detects that an unexpected event has occurred in the aircraft has been generally described. It will be appreciated, however, that the processor 102 may detect that the unexpected event has occurred either automatically or in response to an initiation signal. More specifically, the situational model 130 implemented in the processor 102 may be configured, based on data supplied from the data sources 104, to automatically detect that the unexpected event has occurred. In some embodiments, as FIG. 1 further depicts, the system 100 may include a manually manipulated initiation mechanism, such as a button or switch 122, configured to selectively supply an initiation signal. In these embodiments, the processor 102 is configured to receive the initiation signal and, based on receipt of the initiation signal, detects that the unexpected event has occurred.

Figure 2:
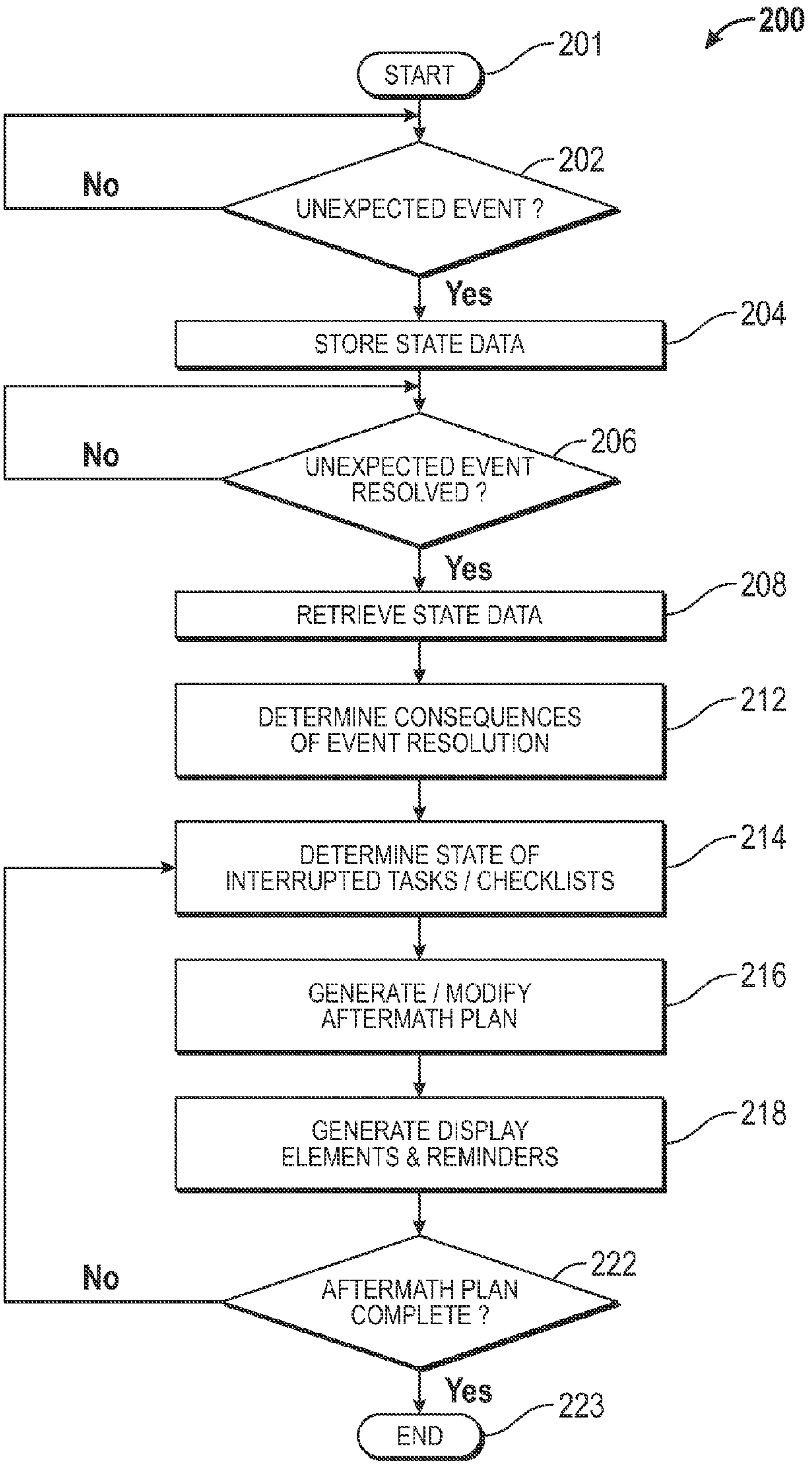
FIG. 2 depicts a process, in flowchart form, that the system of FIG. 1 may implement.

The general methodology that is implemented by the processor 102, and that was described above, is depicted in flowchart form in FIG. 2. For completeness, a description of this method 200 will now be provided. In doing so, it is noted that the parenthetical references in the following description refer to like-numbered flowchart blocks.

The method 200 begins when the processor 102 detects that an unexpected event has occurred in the aircraft (202). In response to detecting that the unexpected event has occurred, the processor 102 stores state data in the memory 116 (204). As noted above, these state data include data representative of partially completed flight crew tasks and/or checklists that were initiated before the unexpected event occurred, the configurations of selected cockpit components, flight crew state, passenger state, aircraft state, and ATC state before the unexpected event occurred (204).

When the processor 102 detects that the unexpected event has been resolved (206), the processor 102 retrieves the state data from the memory 116 (208). The processor 102, based on the retrieved state data and on assessments (by the situational model 130) of the current configurations of selected cockpit components, the current flight crew state, the current passenger states, the current aircraft state, and the current ATC state, determines the overall consequences of the flight crew actions to resolve the unexpected event (212) and the state of interrupted crew tasks and/or checklists (214). The processor 102 then generates an aftermath plan for addressing the consequences of resolving the unexpected event (216).

Upon generation of the aftermath plan, the processor 102 will generate various display elements and reminders to implement the aftermath plan (218). As previously noted, the aftermath plan may include one or more of generating one or more reminders that prompt the flight crew to complete the partially completed flight crew tasks, generating signals that will return the selected cockpit components to the configurations before the unexpected event occurred, generating a prioritized list and/or a timeline of flight crew tasks to return the aircraft to a desirable state, and implementing a prospective memory aid. No matter the specific components of the aftermath plan, it is continuously updated/modified as each portion of the aftermath plan is implemented (214-218) until the aftermath plan is fully completed (222).

This system and method described herein provides a decision support system that assists the flight crew in transitioning back to normal operations after the resolution of an unexpected event. The system and method provide reminders of interrupted and pending tasks, descriptions of what has changed on the cockpit to support a rapid updating of situation awareness, reconfiguring the systems and displays back to the way they were before the unexpected event, reminders of upcoming tasks, and so on. As a result, the down-stream consequences of the unexpected event are mitigated by assisting the flight crew to manage the aftermath of the unexpected event.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of assisting recovery by a flight crew in the aftermath of an unexpected event, the method comprising the steps of:

using a processor to detect that an unexpected event has occurred in an aircraft;

in response to detecting that the unexpected event has occurred, storing state data in memory, the state data representative of at least partially completed flight crew tasks that were initiated before the unexpected event occurred, configurations of selected cockpit components when the unexpected event occurred, flight crew state when the unexpected event occurred, passenger state when the unexpected event occurred, aircraft state when the unexpected event occurred, and air traffic control (ATC) state when the unexpected event occurred;

using the processor to detect that the unexpected event has been resolved; and in response to detecting that the unexpected event has been resolved, using the processor to:

retrieve the state data from the memory, generate an aftermath plan that includes prompts to guide the flight crew to complete the aftermath plan, and continuously update the aftermath plan until the aftermath plan is completed.

2. The method of claim 1, wherein:

the aftermath plan includes one or more reminders that prompt the flight crew to complete the partially completed flight crew tasks; and the method further comprises using the processor to generate the one or more reminders.

3. The method of claim 1, further comprising:

using the processor to generate signals that will return the selected cockpit components to the configurations before the unexpected event occurred.

4. The method of claim 1, wherein:

the aftermath plan further includes a prioritized list of flight crew tasks to return the aircraft to a desirable state; and the method further includes using the processor to generate, on a display device, the prioritized list of flight crew tasks.

5. The method of claim 1, wherein:

the aftermath plan further includes (i) a first timeline of actions taken by the flight crew to resolve the unexpected event and (ii) a second timeline of actions the flight crew should take following the unexpected event; and the method further includes using the processor to generate, on a display device, the first and second timelines.

6. The method of claim 1, wherein:

the aftermath plan further includes one or more reminders that remind the flight crew of one or more future tasks; and the method further comprises using the processor to generate the one or more reminders.

7. The method of claim 1, further comprising:

generating a situational model for the aircraft, the situational model including at least elements representative of flight crew tasks, current aircraft state, and current flight crew state; and implementing the situational model in the processor.

8. The method of claim 7, wherein the situational model, upon detection that the unexpected event has been resolved, is configured to (i) assess current states of crew tasks, current aircraft state, current ATC state, and general passenger states and (ii) based on these assessments, determine overall consequence of flight crew actions to resolve the unexpected event.

9. The method of claim 7, wherein the situational model implemented in the processor automatically detects that the unexpected event has occurred.

10. The method of claim 1, further comprising:

supplying an initiation signal from a manually manipulated initiation mechanism to the processor, whereby the processor uses the initiation signal to detect that the unexpected event has occurred.

11. A system for assisting recovery by a flight crew in the aftermath of an unexpected event, the system comprising:

memory configured to have data stored therein; and a processor in operable communication with the memory and configured to:

detect that an unexpected event has occurred in an aircraft and, upon detecting that the unexpected event has occurred, store state data in the memory, the state data representative of at least partially completed flight crew tasks that were initiated before the unexpected event occurred, configurations of selected cockpit components when the unexpected event occurred, flight crew state when the unexpected event occurred, passenger state when the unexpected event occurred, aircraft state when the unexpected event occurred, and air traffic control (ATC) state when the unexpected event occurred, and detect that the unexpected event has been resolved and, in response to detecting that the unexpected event has been resolved (i) retrieve the state data from the memory, (ii) generate an aftermath plan that includes prompts to guide the flight crew to complete the aftermath plan, and (iii) continuously update the aftermath plan until the aftermath plan is completed.

12. The system of claim 11, wherein:

the aftermath plan includes one or more reminders that prompt the flight crew to complete the partially completed flight crew tasks; and the processor is further configured to generate the one or more reminders.

13. The system of claim 11, wherein the processor is further configured, in response to detecting that the unexpected event has been resolved, to generate signals that will return the selected cockpit components to the configurations before the unexpected event occurred.

14. The system of claim 11, wherein:

the aftermath plan further includes a prioritized list of flight crew tasks to return the aircraft to a desirable state; and the processor is further configured to generate the prioritized list of flight crew tasks.

15. The system of claim 11, wherein:

the aftermath plan further includes (i) a first timeline of actions taken by the flight crew to resolve the unexpected event and (ii) a second timeline of actions the flight crew should take following the unexpected event; and the processor is further configured to generate the first and second timelines.

16. The system of claim 11, wherein:

the aftermath plan further includes one or more reminders that remind the flight crew of one or more future tasks; and the processor is further configured to generate the one or more reminders.

17. The system of claim 11, wherein the processor is further configured to implement a situational model for the aircraft, the situational model including at least elements representative of flight crew tasks, current aircraft state, and current flight crew state.

18. The system of claim 17, wherein the situational model, upon detection by the processor that the unexpected event has been resolved, is configured to (i) assess current states of crew tasks, current aircraft state, current ATC state, and general passenger states and (ii) based on these assessments, determine overall consequence of flight crew actions to resolve the unexpected event.

19. The system of claim 17, wherein the situational model implemented in the processor automatically detects that the unexpected event has occurred.

20. The system of claim 11, further comprising:

a manually manipulated initiation mechanism configured to selectively supply an initiation signal, wherein the processor is configured to receive the initiation signal and, based on receipt thereof, detects that the unexpected event has occurred.

* * * * *